United States Patent [19]

Freedenberg et al.

[11] Patent Number: 5,305,138

[45] Date of Patent: Apr. 19, 1994

[54] SUPERACHROMATIC UV AND VISIBLE FOCUSING OBJECTIVE LENS

[75] Inventors: Candace J. Freedenberg, Holly Ridge, N.C.; Frederick A. Herring, Wappingers Falls; Uldis A. Ziemins, Poughkeepsie, both of N.Y.

[73] Assignee: International Business Machines Corporation, Armonk, N.Y.

[21] Appl. No.: 923,283

[22] Filed: Jul. 31, 1992

[51] Int. Cl.$^5$ ............... G02B 13/14; G02B 13/00; G02B 9/08; G02B 9/12

[52] U.S. Cl. ............... 359/355; 359/722; 359/740; 359/784

[58] Field of Search ............... 359/355, 357, 754, 784, 359/786, 792, 794, 722, 740

[56] References Cited

U.S. PATENT DOCUMENTS

| | | | |
|---|---|---|---|
| 3,348,896 | 10/1967 | Betensky | 359/355 |
| 3,391,968 | 7/1968 | Betensky | 359/355 |
| 4,702,569 | 10/1987 | Mercado et al. | 359/722 |
| 4,704,011 | 11/1987 | Mercado | 359/768 |
| 4,871,243 | 10/1989 | Ogawa et al. | 359/754 |
| 4,955,701 | 9/1990 | Kataoka et al. | 359/738 |
| 5,159,496 | 10/1992 | Kataoka | 359/754 |
| 5,172,275 | 12/1992 | De Jager | 359/755 |

OTHER PUBLICATIONS

IBM Technical Disclosure Bulletin, vol. 33, No. 4, Sep. 1990, pp. 206–207, Herring et al. Excimer Laser Objective Lens.

Primary Examiner—Loha Ben
Assistant Examiner—John Juba, Jr.
Attorney, Agent, or Firm—Aziz M. Ahsan

[57] ABSTRACT

A superachromatic focusing objective lens which focuses wavelengths extending between the ultraviolet and the visible wavelength spectrum and is able to achieve superachromatic correction for three wavelengths within the visible spectrum is disclosed. The present objective lens includes an achromatic lens to assist in the correction spherical and coma aberration, a modified gauss for minimizing spherochromatism, a reversed modified gauss for adding symmetry to aid in the correction of coma, distortion and lateral color aberrations, and a stop located between the modified gauss and the reverse modified gauss. A glass plate is provided for forming a splatter shield to protect the lens from debris, and may be used to define one wall of a vacuum chamber. The elements of the objective lens may be made from various glasses to include calcium fluoride, quartz, and barium fluoride.

14 Claims, 9 Drawing Sheets

FIG. 2A

| SURFACE | RADIUS (mm) | THICKNESS (mm) | CLEAR DIA. (mm) | MATERIAL |
|---|---|---|---|---|
| 1201 | 83.230 | | 30.00 | AIR |
| 1202 | -32.070 | 6.50 | 30.00 | $CaF_2$ |
| 1203 | -29.510 | 0.38 | 27.00 | AIR |
| 1204 | 359.320 | 2.00 | 30.00 | $SiO_2$ |
| 1205 | 36.530 | 0.38 | 26.00 | AIR |
| 1206 | -162.200 | 5.00 | 26.00 | $CaF_2$ |
| 1207 | 22.500 | 0.50 | 24.00 | AIR |
| 1208 | -54.470 | 6.00 | 24.00 | $CaF_2$ |
| 1209 | -72.920 | 0.40 | 24.00 | AIR |
| 1210 | 15.710 | 1.50 | 19.00 | $BaF_2$ |
| 1211 | 15.720 | 4.00 | 15.73 | AIR |
| 1212 | -15.680 | 4.00 | 19.00 | AIR |
| 1213 | 22.500 | 1.50 | 21.00 | $SiO_2$ |
| 1214 | 24.015 | 0.43 | 21.00 | AIR |
| 1215 | -18.640 | 6.50 | 21.00 | $CaF_2$ |
| 1216 | 59.200 | 0.40 | 21.00 | AIR |
| 1217 | 18.640 | 2.00 | 19.00 | $BaF_2$ |
| 1218 | 18.710 | 0.55 | 21.00 | AIR |
| 1219 | -47.290 | 6.00 | 21.00 | $CaF_2$ |
| 1220 | PLANE | 1.50 | 30.00 | AIR |
| 1221 | PLANE | 3.18 | 30.00 | $SiO_2$ |
| IMAGE PLANE | | 27.97 | 37.43 | AIR |

FIG. 2B

| SURFACE | MATERIAL | INDEX @ .3080nm | INDEX @ .5461nm | INDEX @ .6328nm | INDEX @ .486nm | VD |
|---|---|---|---|---|---|---|
| 1201 | AIR | | | | | |
| 1202 | CAF₂ | 1.45255 | 1.43494 | 1.43289 | 1.43703 | 71.41 |
| 1203 | AIR | | | | | |
| 1204 | SIO₂ | 1.48564 | 1.46008 | 1.45702 | 1.45313 | 99.74 |
| 1205 | AIR | | | | | |
| 1206 | CAF₂ | 1.45255 | 1.43494 | 1.43289 | 1.43703 | 71.41 |
| 1207 | AIR | | | | | |
| 1208 | CAF₂ | 1.45255 | 1.43494 | 1.43289 | 1.43703 | 71.41 |
| 1209 | AIR | | | | | |
| 1210 | BAF₂ | 1.49901 | 1.47586 | 1.47327 | 1.47855 | 81.58 |
| 1211 | AIR | | | | | |
| 1212 | AIR | | | | | |
| 1213 | SIO₂ | 1.48564 | 1.46008 | 1.45702 | 1.46313 | 99.74 |
| 1214 | AIR | | | | | |
| 1215 | CAF₂ | 1.45255 | 1.43494 | 1.43289 | 1.43703 | 71.41 |
| 1216 | AIR | | | | | |
| 1217 | BAF₂ | 1.49901 | 1.47586 | 1.47327 | 1.47855 | 81.58 |
| 1218 | AIR | | | | | |
| 1219 | CAF₂ | 1.45255 | 1.43494 | 1.43289 | 1.43703 | 71.41 |
| 1220 | AIR | | | | | |
| 1221 | SIO₂ | 1.48564 | 1.45008 | 1.45702 | 1.46313 | 99.74 |
| IMAGE | AIR | | | | | |

AXIS 0.50 DEG 1.00 DEG 1.50 DEG

SUPERACHROMATIC UV AND VISIBLE FOCUSING OBJECTIVE LENS

The present invention generally relates to an objective lens usable with a beam delivery system, and more particularly relates to an superachromatic focusing objective lens for both UV and visible light simultaneously.

BACKGROUND OF THE INVENTION

Objective lenses are well known and provide the final focusing element in an optical train of components in an optical system such as a micro-machining apparatus for using a laser beam to micro-machine a workpiece. Achromatic objectives which focus only two wavelengths at the same point are known. Apochromatic objectives which focus three wavelengths of light at the same point are also known. The lens disclosed in IBM Technical Disclosure Bulletin, Vol. 33, No. 04, September 1990, *Eximer Laser Lens*, pages 206–207 is apochromatic between the ultraviolet and the visible wavelengths of light, however only achieves achromatic correction for two wavelengths in the visible band.

SUMMARY OF THE INVENTION

The present invention is an superachromatic focusing objective lens which focuses wavelengths in the ultraviolet and the visible wavelength spectrum and is able to achieve apochromatic correction for three wavelengths within the visible spectrum. The present objective lens includes an achromatic lens to assist in the correction spherical and coma aberration, a modified gauss for minimizing spherochromatism, a reversed modified gauss for adding symmetry to aid in the correction of coma, distortion and lateral color aberrations, and a stop located between the modified gauss and the reverse modified gauss. A glass plate is provided for forming a splatter shield to protect the lens from debris caused by the micro-machining process, and may be used to define one wall of a vacuum chamber. The elements of the objective lens may be made from various glasses to include calcium fluoride, quartz, and barium fluoride.

It is an object of the present invention to provide an objective lens for color correction of more than one wavelength.

It is another object of the present invention to provide an objective lens having a large back focal length for use with a laser micro-machining apparatus.

It is another object of the present invention to provide an objective lens having elements made of calcium fluoride, quartz, and barium fluoride glasses.

It is another object of the present invention to provide an objective lens which incorporates a quartz glass plate such that the objective lens may be used to define one wall of a vacuum chamber.

The foregoing and other objects, features and advantages of the invention will be apparent from the following more particular description of the preferred embodiment of the invention as illustrated in the drawings.

BRIEF DESCRIPTION OF THE DRAWINGS

FIGS. 2A and 2B is a table of the prescription of the objective lens of FIG. 1;

DESCRIPTION OF THE PREFERRED EMBODIMENT

Figure 1:
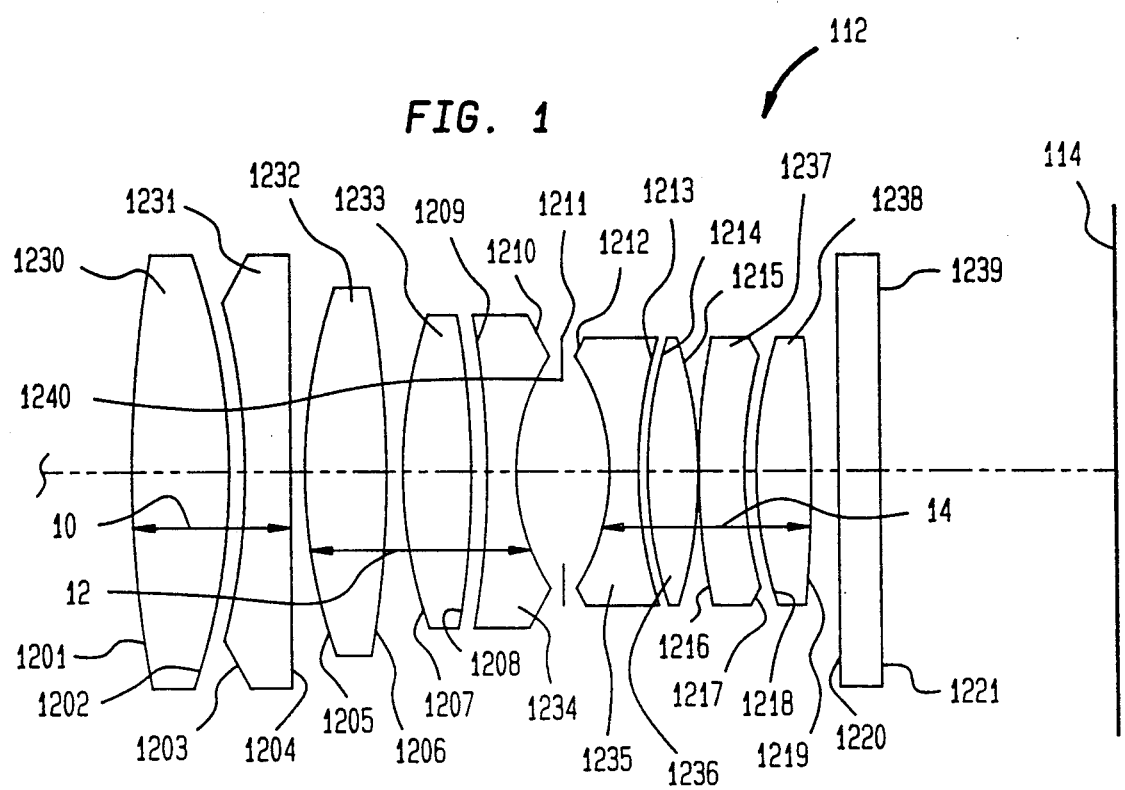
FIG. 1 is a diagram of the superachromatic focusing objective lens of the present invention.
Figure 14A:
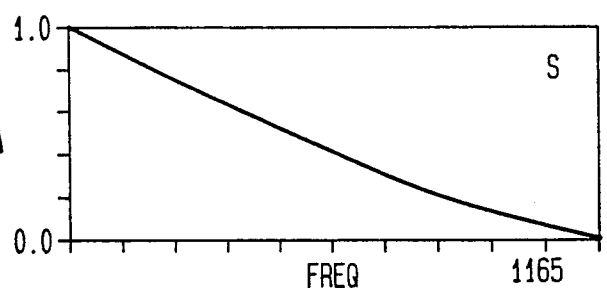
FIGS. 14A, 14B and 14C are plots of diffraction modulation transfer functions for ultraviolet light similar to that of FIG. 12 for off axis sagittal positions of 0.25, 0.35 and 0.50 degrees, respectively.
Figure 14B:
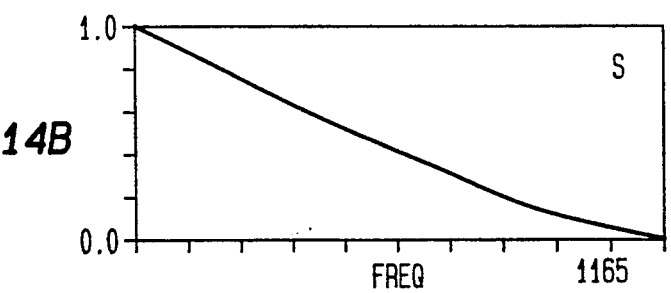
Figure 14C:
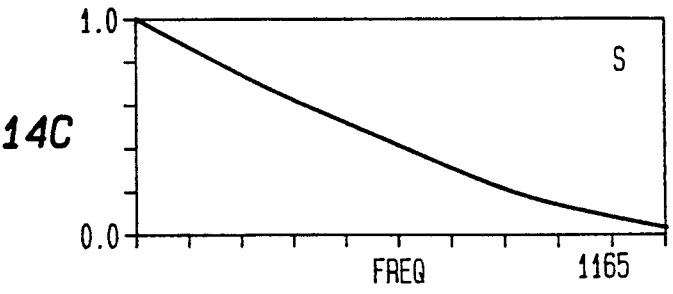
Figure 3:
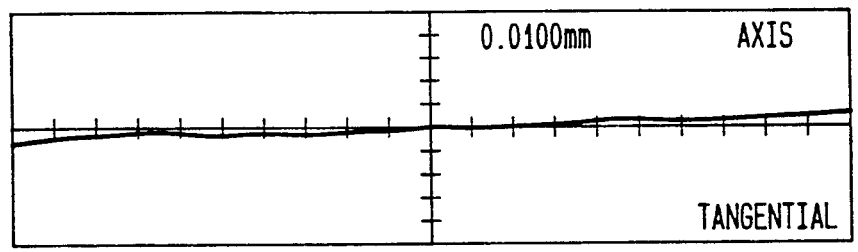
FIG. 3 is a plot of the transverse ray aberrations taken on axis for the objective lens of FIG. 1 for three wavelengths in the visible octave at the focus position ultraviolet light, a defocus of −0.014 mm.
Figure 4A:
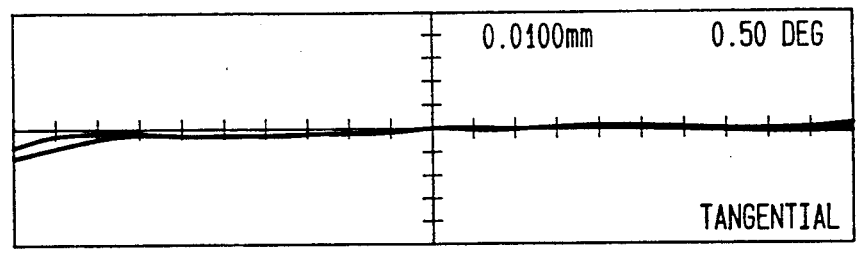
FIGS. 4A, 4B and 4C are transverse ray aberrations for visible light similar to FIG. 3 for off axis tangential positions of 0.5, 1.0 and 1.5 degrees, respectively.
Figure 4B:
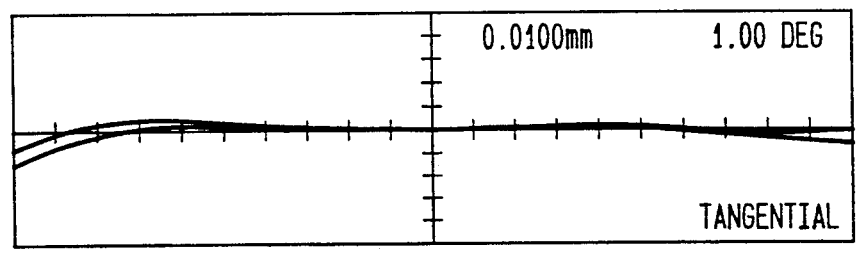
Figure 4C:
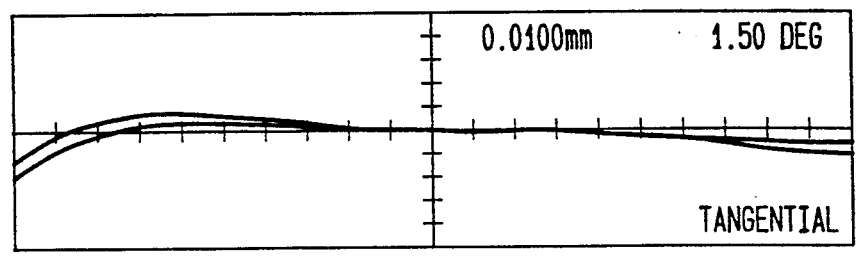
Figure 5A:
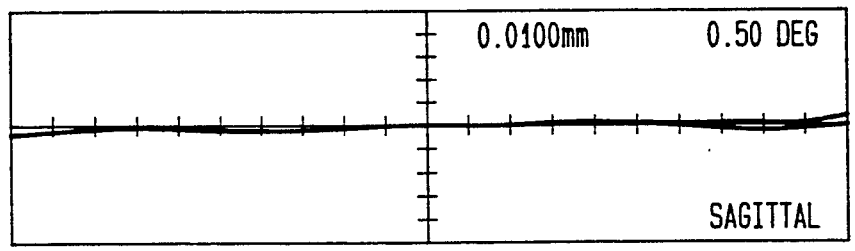
FIGS. 5A, 5B and 5C are plots of transverse ray aberrations for visible light similar to that of FIG. 3 for off axis sagittal positions of 0.5, 1.0 and 1.5 degrees, respectively.
Figure 5B:
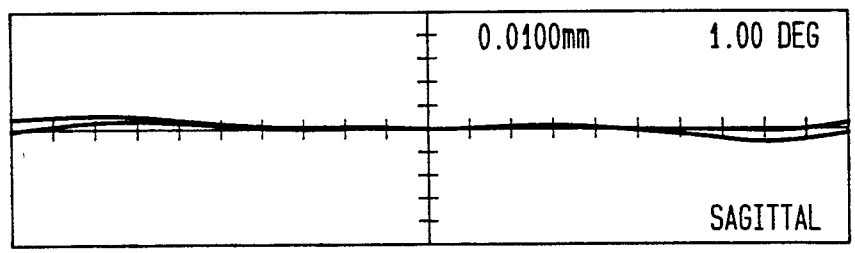
Figure 5C:
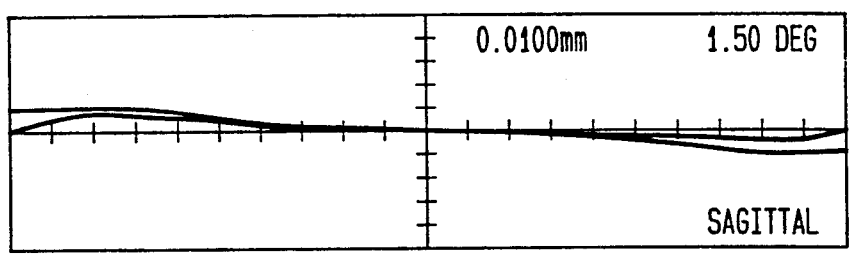
Figure 6:
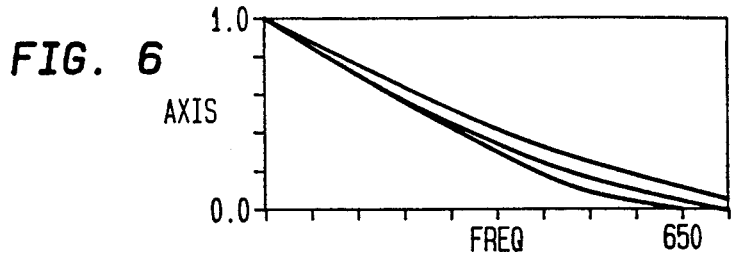
FIG. 6 is a plot of the diffraction modulation transfer function of the objective lens of FIG. 1 for three visible light wavelengths at the focus position of ultraviolet light, a defocus of −0.014 mm.
Figure 7A:
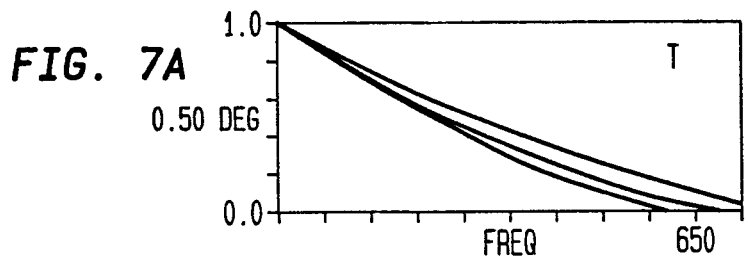
FIGS. 7A, 7B and 7C are diffraction modulation transfer functions for visible light similar to those of FIG. 6 for off axis tangential positions of 0.5, 1.0 and 1.5 degrees, respectively.
Figure 7B:
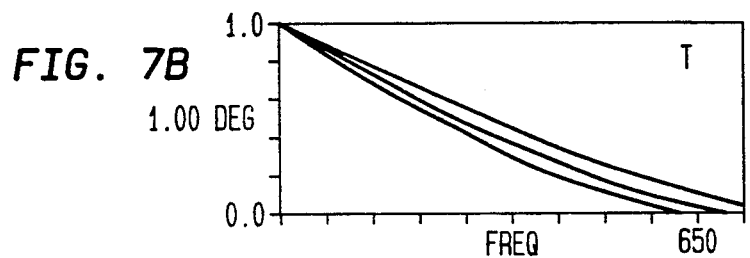
Figure 7C:
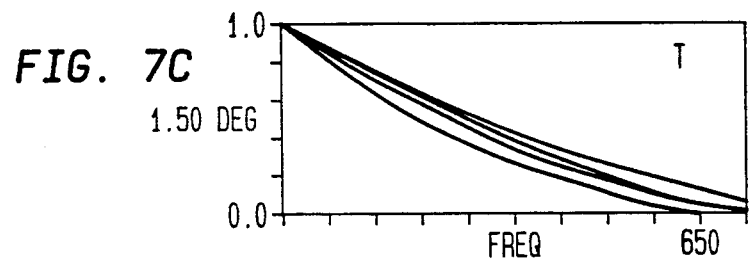
Figure 8A:
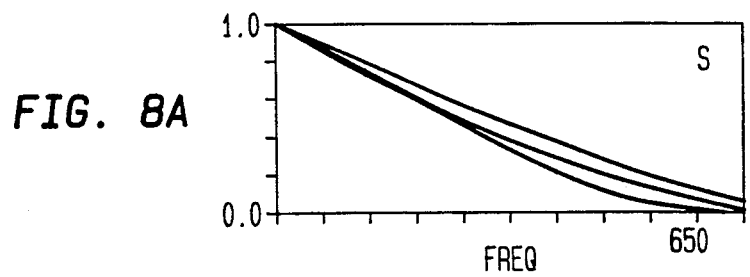
FIGS. 8A, 8B and 8C are plots of diffraction modulation transfer functions for visible light similar to that of FIG. 6 for off axis sagittal positions of 0.5, 1.0 and 1.5 degrees, respectively.
Figure 8B:
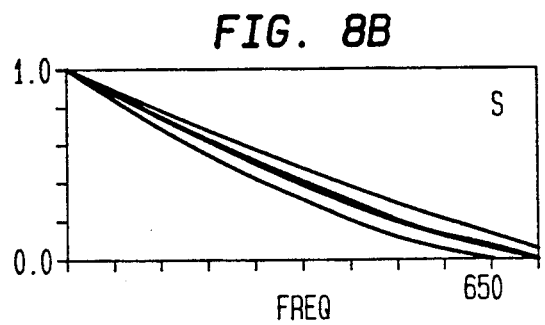
Figure 8C:
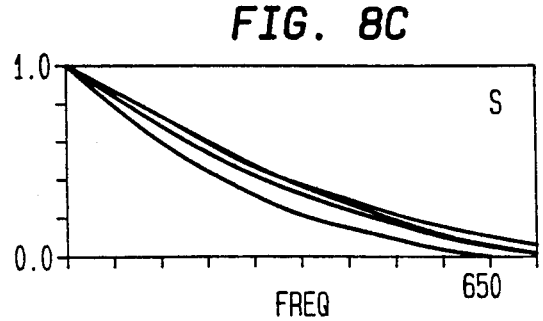
Figure 9:
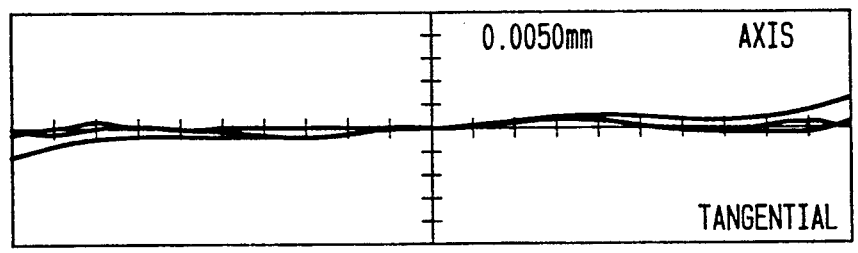
FIG. 9 is a plot of the transverse ray aberrations taken on axis for the objective lens of FIG. 1 for three wavelengths from both the ultraviolet and visible octaves of light.
Figure 10A:
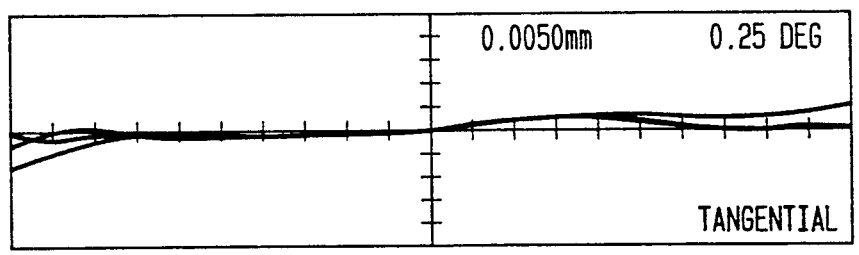
FIGS. 10A, 10B and 10C are transverse ray aberrations for both the ultraviolet and visible octaves of light similar to FIG. 9 for off axis tangential positions of 0.25, 0.35 and 0.50 degrees, respectively.
Figure 10B:
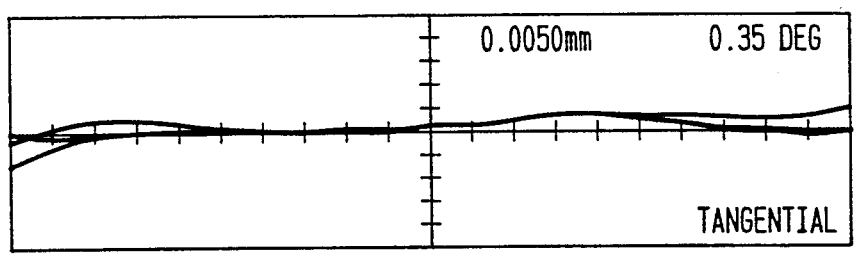
Figure 10C:
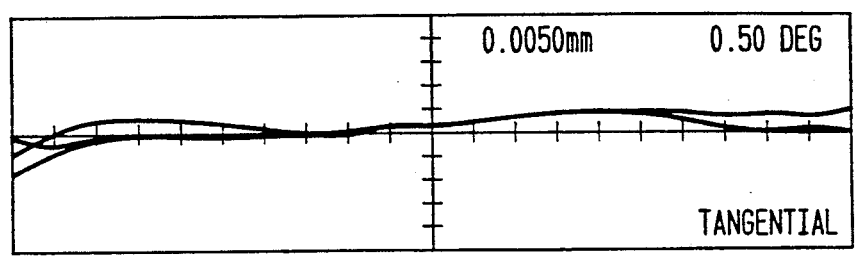
Figure 11A:
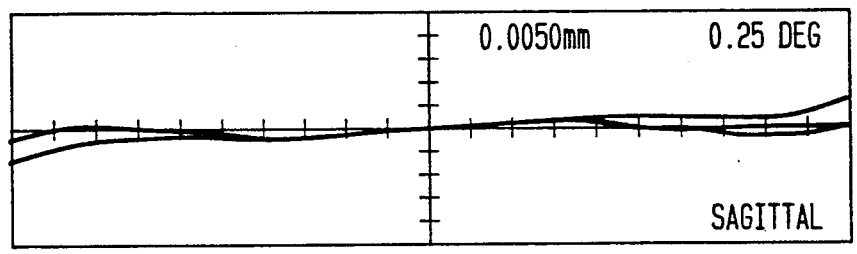
FIGS. 11A, 11B and 11C are plots of transverse ray aberrations for both the ultraviolet and visible octaves of light similar to that of FIG. 9 for off axis sagittal positions of 0.25, 0.35 and 0.50 degrees, respectively.
Figure 11B:
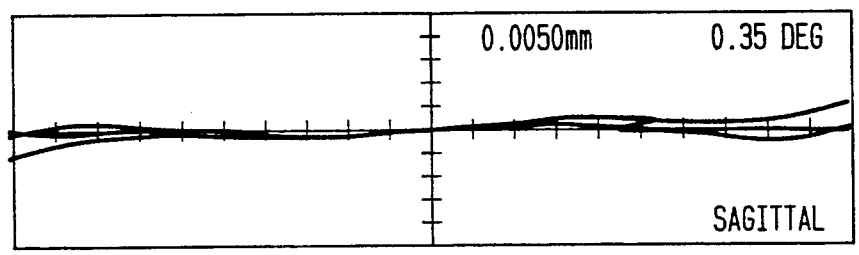
Figure 11C:
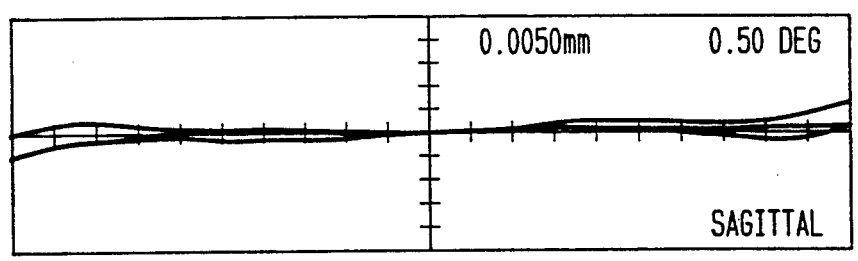
Figure 12:
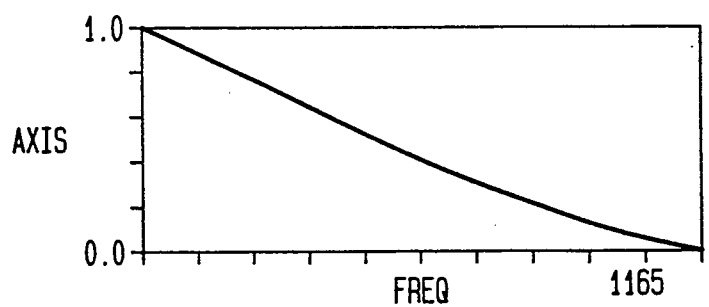
FIG. 12 is a plot of the diffraction modulation transfer function of the objective lens of FIG. 1 for ultraviolet light.
Figure 13A:
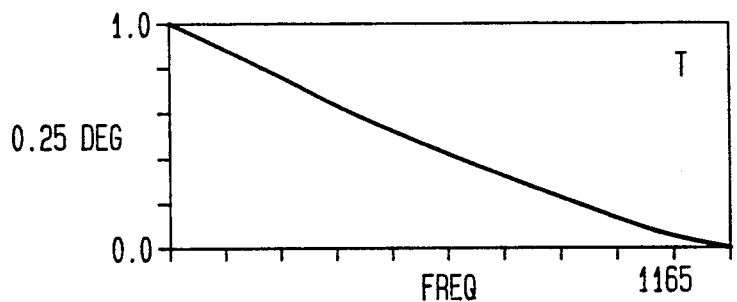
FIGS. 13A, 13B and 13C are diffraction modulation transfer functions for the ultraviolet light similar to those of FIG. 12 for off axis tangential positions of 0.25, 0.35 and 0.50 degrees, respectively.
Figure 13B:
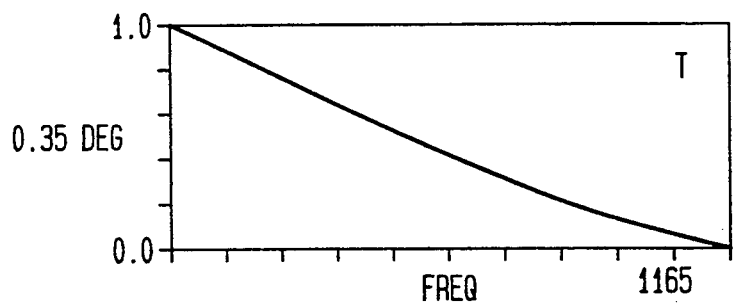
Figure 13C:
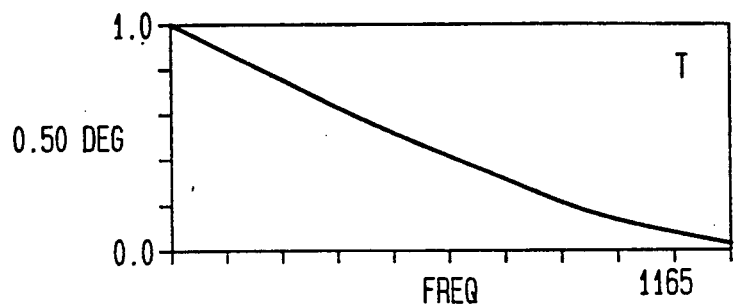

The present invention is an superachromatic focusing objective lens for use with a laser micro-machining apparatus such as that disclosed in co-pending patent application Ser. No. 07/923,284, filed on Jul. 31, 1992 entitled "Variable Magnification Imaging System", owned by the assignee of the present invention. FIG. 1 shows the objective lens 112 having ten elements. The first two elements 1230 and 1231 form an achromatic lens 10 for assisting in the correction of spherical and coma aberration. Elements 1232, 1233 and 1234 form a modified gauss 12 on the optical axis of the achromatic lens 10 for minimizing spherochromatism. The elements 1235, 1236, 1237 and 1238 form a reverse modified gauss 14 on the optical axis of the modified gauss 12. The reverse modified gauss 14 adds symmetry and aids in the correction of coma, distortion and lateral color aberrations. A stop or an aperture 1240 is provided between the modified gauss 12 and the reverse modified gauss 14 and has maximum a clear opening having a diameter of 21 mm. A splatter plate 1239 protects the rest of the objective lens from the debris caused by the micro-machining process when the objective lens is used in a micro-machining apparatus. It will be understood that the splatter plate 1239 may define one wall of a vacuum chamber used in the micro-machining process.

The design of the objective lens 112 is shown in FIGS. 1, 2A and 2B. In the objective lens 112, the element 1230 has surfaces 1201 and 1202, element 1231 has surfaces 1203 and 1204, element 1232 has surfaces 1205 and 1206, element 1233 has surfaces 1207 and 1208, element 1234 has surfaces 1209 and 1210, element 1235 has surfaces 1212 and 1213, element 1236 has surfaces 1214 and 1215, element 1237 has surfaces 1216 and 1217, element 1238 has surfaces 1218 and 1219, and element 1239 which is a plate has surfaces 1220 and 1221. An aperture or a stop 1240, which is listed as surface 1211 in FIGS. 2A and 2B, is located between the surfaces 1210 and 1212 of elements 1234 and 1235, respectively. The objective lens 112 has a long working distance to allow for fixturing and clearance of a workpiece on the image plane 114. Where the workpiece is in a chamber (not shown) the thickness of the plate 1239 may vary in thickness, depending on the thickness of the chamber cover.

As shown in FIGS. 2A and 2B, elements 1230, 1232, 1233, 1236 and 1238 are made of calcium fluoride glass. Elements 1231, 1235 and 1239 are made of quartz. Elements 1234 and 1237 are made of barium fluoride glass.

The superachromatic focusing objective lens of the present invention is corrected for ultraviolet light having a wavelength of 308 nanometers and for visible light having the wavelengths of 486, 546 and 633 nanometers.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim as new, and desire to secure by Letters Patent is:

1. A superachromatic objective lens system comprising:
   a) a stop,
   b) a reverse modified gauss lens system disposed on one side of said stop,
   c) a modified gauss lens system disposed on the other side of said stop,
   d) an achromatic lens system disposed on the opposite side of said modified gauss lens system, and thereby forming said superachromatic lens system where each of said lens system comprises UV transmitting elements of crystalline structure.

2. The objective lens of claim 1, wherein said objective lens has at least one means to provide for a large back focal length.

3. The objective lens of claim 1, wherein said objective lens has at least one means for color correction of at least one wavelength.

4. The objective lens of claim 1 wherein said objective lens has at least one means to correct for one wavelength in the ultraviolet octave and three wavelengths in the visible octave of the light spectrum.

5. The objective lens of claim 4 wherein said corrected wavelength in said ultraviolet octave is 308 nanometers, and wherein said corrected wavelengths in the visible octave are 486, 546 and 633 nanometers.

6. The objective lens of claim 1 wherein said glass is one of claim fluoride, quartz and barium fluoride.

7. The objective lens of claim 1 wherein said achromatic lens has a first element having first and second surfaces and a second element having third and forth surfaces, said first and second elements having the prescription:

| surface | radius (mm) | thick. (mm) | clear dia. (mm) | glass |
|---|---|---|---|---|
| first | 83.230 | | 30.00 | |
| second | −32.070 | 6.50 | 30.00 | CAF$_2$ |
| third | −29.510 | 0.38 | 27.00 | |
| fourth | 359.320 | 2.00 | 30.00 | SIO$_2$. |

8. The objective lens of claim 7 wherein said modified gauss has a third element having fifth and sixth surface, a fourth element having seventh and eighth surfaces, and a fifth element having ninth and tenth surfaces, said third, fourth and fifth elements having the prescription:

| surface | radius (mm) | thick. (mm) | clear dia. (mm) | glass |
|---|---|---|---|---|
| fifth | 36.530 | | 26.00 | |
| sixth | −162.200 | 5.00 | 26.00 | CAF$_2$ |
| seventh | 22.500 | 0.50 | 24.00 | |
| eighth | −54.470 | 6.00 | 24.00 | CAF$_2$ |
| ninth | −72.920 | 0.40 | 24.00 | |
| tenth | 15.710 | 1.50 | 19.00 | BAF$_2$. |

9. The objective lens of claim 8 wherein said reverse modified gauss has a sixth element having 11th and 12th surfaces, a seventh element having 13th and 14th surfaces, a eighth element having 15th and 16th surfaces, and ninth element having 17th and 18th surfaces, said sixth, seventh, eighth, and ninth elements having the prescription:

| surface | radius (mm) | thick. (mm) | clear dia. (mm) | glass |
|---|---|---|---|---|
| 11th | −15.680 | | 19.00 | |
| 12th | 22.500 | 1.50 | 21.00 | SIO$_2$ |
| 13th | 24.015 | 0.43 | 21.00 | |
| 14th | −18.640 | 6.50 | 21.00 | CAF$_2$ |
| 15th | 59.200 | 0.40 | 21.00 | |
| 16th | 18.640 | 2.00 | 19.00 | BAF$_2$ |
| 17th | 18.710 | 0.55 | 21.00 | |
| 18th | −47.290 | 6.00 | 21.00 | CAF$_2$. |

10. The objective lens of claim 9 further including a stop having a clear diameter of 12.73 mm and spaced between said fifth element and said sixth element, the stop being 4.00 mm from said tenth surface and 4.00 mm from said eleventh surface.

11. The objective lens of claim 10 wherein said modified gauss is spaced from said achromatic lens such that said fifth surface is 0.38 mm from said fourth surface.

12. The objective lens of claim 11 further comprising a glass splatter shield spaced 1.50 mm after said 18th surface to protect the objective lens from contamination.

13. The objective lens of claim 12 wherein said glass splatter shield is 3.18 mm thick and made of SIO$_2$.

14. The objective lens of claim 12, wherein at least a portion of said glass splatter shield is a cover of a vacuum chamber.

* * * * *